(12) United States Patent
Zhang

(10) Patent No.: US 11,872,894 B2
(45) Date of Patent: Jan. 16, 2024

(54) ELECTRIC VEHICLE'S DRIVE SYSTEM AND METHOD FOR CONTROLLING THE SAME

(71) Applicant: Volvo Car Corporation, Gothenburg (SE)

(72) Inventor: Wei Zhang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 219 days.

(21) Appl. No.: 17/472,808

(22) Filed: Sep. 13, 2021

(65) Prior Publication Data

US 2022/0097534 A1 Mar. 31, 2022

(30) Foreign Application Priority Data

Sep. 29, 2020 (CN) .......................... 202011052106.8

(51) Int. Cl.
*B60L 15/20* (2006.01)

(52) U.S. Cl.
CPC ........... *B60L 15/2045* (2013.01); *B60L 15/20* (2013.01); *B60L 15/2036* (2013.01); *B60L 15/2009* (2013.01); *B60L 2240/12* (2013.01); *B60L 2240/421* (2013.01); *B60L 2240/423* (2013.01); *B60L 2250/26* (2013.01)

(58) Field of Classification Search
CPC .. B60L 15/2045; B60L 15/20; B60L 15/2036; B60L 15/2009; B60L 2240/12; B60L 2240/421; B60L 2240/423; B60L 2250/26; B60L 2220/42; B60L 2240/463; Y02T 10/72; Y02T 10/64; B60W 30/18; B60W 2710/083; B60W 2720/403
See application file for complete search history.

(56) References Cited

U.S. PATENT DOCUMENTS

2017/0050536 A1* 2/2017 Martin ................ B60K 17/356
2018/0079415 A1 3/2018 Moriya et al.
2019/0263413 A1* 8/2019 Hancock ............... B60W 30/02

OTHER PUBLICATIONS

Feb. 10, 2022 European Search Report issued in corresponding International Application No. 21199407.

* cited by examiner

*Primary Examiner* — Alan D Hutchinson
(74) *Attorney, Agent, or Firm* — Clements Bernard Walker; Christopher L. Bernard

(57) ABSTRACT

A drive system for an electric vehicle and a method for controlling the same. The drive system includes: a front wheel electric motor and a rear wheel electric motor of the same specification; a front wheel reducer whose output shaft is operatively coupled to a front wheel drive axle of the electric vehicle via the front wheel electric motor; and a rear wheel reducer whose output shaft is operatively coupled to a rear wheel drive axle of the electric vehicle via the rear wheel electric motor, wherein the front wheel reducer has a transmission ratio different than that of the rear wheel electric motor.

14 Claims, 4 Drawing Sheets

Replacement Drawings

ELECTRIC VEHICLE'S DRIVE SYSTEM AND METHOD FOR CONTROLLING THE SAME

CROSS-REFERENCE TO RELATED APPLICATION

The present disclosure claims the benefit of priority of co-pending Chinese Patent Application No. 202011052106.8, filed on Sep. 29, 2020, and entitled "Electric Vehicle's Drive System and Method for Controlling the Same," the contents of which are incorporated in full by reference herein.

FIELD

The present application generally relates to a drive system for an electric vehicle and a method for controlling the drive system.

BACKGROUND

In a conventional drive system, especially a four-wheel drive system, of an electric vehicle, two electric motors will be adopted to be operatively coupled to front and rear wheels of the vehicle respectively. In this way, the front wheel's electric motor is configured to drive a front left wheel and a front right wheel via a front wheel drive axle, and the rear wheel's electric motor is configured to drive a rear left wheel and a rear right wheel via a rear wheel drive axle. A reducer, for example a two-stage reduction gear, is usually disposed between each electric motor and its respective wheel drive axle so as to reduce the high speed of the electric motor's shaft and transfer a torque generated by the electric motor to the respective wheel drive axle.

For the purpose of cost savings, the models of the two electric motors relevant to the front and rear wheel drive axles are identical to each other, and thus the two reducers corresponding to them are also identical to each other. That is to say, as the electric vehicle is running, the shaft of the front wheel's electric motor has the same rotating speed as the shaft of the rear wheel's electric motor. Therefore, peak powers output by them are identical to each other, and torques output by them are identical to each other, respectively. Similarly, as the electric vehicle is running in a deccelerating manner, peak drag powers provided by the front and rear wheel's electric motors during energy recovery are also identical to each other, and peak drag torques provided by the front and rear wheel's electric motors during energy recovery are also identical to each other, respectively.

Especially take acceleration of the running electric vehicle for example. Usually during the acceleration of the electric vehicle, due to influence caused by the electric vehicle's weight, contact friction between the rear wheels and the ground may be higher and thus contact friction between the front wheels and the ground may be reduced. This will result in that when the vehicle is running at a lower velocity, acceleration performance of the electric vehicle will be influenced more by the rear wheels than by the front wheels. Therefore, torque output applied on the front wheels by the peak torque caused by the front wheel's electric motor will be greater than contact friction torque caused by the front wheels such that the peak torque output by the front wheel's electric motor cannot be thoroughly used to accelerate the vehicle, thus resulting in wasted torque output. In the meanwhile, as the shafts of the front and rear wheel's electric motors are in the same rotating speed range, it is difficult to effectively utilize difference efficiency characteristics at different rotating speeds of the shafts of the front and rear wheel's electric motors for improving the efficiency (or energy utilization efficiency) of the vehicle's drive system.

SUMMARY

In order to solve the above issues, the present application is aimed at proposing an improved drive system for an electric vehicle such that without the electric vehicle's operating performance being greatly reduced, the drive system's efficiency (or energy utilization efficiency) could be enhanced and thus the electric vehicle's endurance mileage could be increased.

According to one aspect of the present application, a drive system for an electric vehicle is provided, including: a front wheel electric motor and a rear wheel electric motor of the same specification; a front wheel reducer whose output shaft is operatively coupled to a front wheel drive axle ($S_F$) of the electric vehicle via the front wheel electric motor; and a rear wheel reducer whose output shaft is operatively coupled to a rear wheel drive axle of the electric vehicle via the rear wheel electric motor, wherein the front wheel reducer has a transmission ratio different than that of the rear wheel electric motor.

Optionally, the transmission ratio of the front wheel reducer is less than the transmission ratio of the rear wheel reducer.

Optionally, the transmission ratio of the front wheel reducer is 40%~90% of the transmission ratio of the rear wheel reducer.

Optionally, a stator's outer diameter, a stator's inner diameter, a rotor's outer diameter and a rotor's inner diameter of the front wheel electric motor are equal to a stator's outer diameter, a stator's inner diameter, a rotor's outer diameter and a rotor's inner diameter of the rear wheel electric motor respectively.

Optionally, the drive system further includes: a central controller; and a motor controller of the front wheel electric motor and a motor controller of the rear wheel electric motor which are electrically connected to the central controller, so as to selectively control operation of the front wheel electric motor via the motor controller of the front wheel electric motor and operation of the rear wheel electric motor via the motor controller of the rear wheel electric motor.

Optionally, the front wheel reducer and/or the rear wheel reducer is a gear reducer.

Optionally, the front wheel electric motor is electrically connected to an accelerator pedal and/or a brake pedal of the electric vehicle through the motor controller of the front wheel electric motor via the central controller and/or the rear wheel electric motor is electrically connected to the accelerator pedal and/or the brake pedal of the electric vehicle through the motor controller of the rear wheel electric motor via the central controller; and wherein the front wheel electric motor and/or the rear wheel electric motor is selectively operated on the basis of the extent to which the accelerator pedal and/or the brake pedal is pressed.

According to another aspect of the present application, a method for controlling a drive system of an electric vehicle is provided, the drive system being configured to include a front wheel electric motor and a rear wheel electric motor of the same specification; a front wheel reducer whose output shaft is operatively coupled to a front wheel drive axle of the electric vehicle via the front wheel electric motor; and a rear wheel reducer whose output shaft is operatively coupled to a rear wheel drive axle of the electric vehicle via the rear wheel electric motor, the front wheel reducer having a transmission ratio different than that of the rear wheel electric motor, the method including: determining, on the basis of the extent to which an accelerator pedal or a brake pedal of the electric vehicle is pressed, a total torque demanded to be exerted on the electric vehicle's wheels for accelerating it or for braking it respectively; determining a rotating velocity of the output shaft of the front wheel electric motor and a rotating velocity of the output shaft of the rear wheel electric motor respectively on the basis of the vehicle's running velocity in combination of the transmission ratio of the front wheel reducer and the transmission ratio of the rear wheel reducer; dividing the total torque between torque outputs of the front wheel electric motor and the rear wheel electric motor as a function of the transmission ratio of the front wheel reducer and the transmission ratio of the rear wheel reducer respectively by a way as follows: determining, according to a relationship between the electric motor torque, rotating speed and efficiency, combinations of a torque to be exerted or applied by the output shaft of the front wheel electric motor and a torque to be exerted or applied by the output shaft of the rear wheel electric motor at a given step size; calculating and summing a power loss of the front wheel electric motor and a power loss of the rear wheel electric motor with regard to each determined torque combination; and comparing the summing results for all the torque combinations and finding one torque combination corresponding to the minimum summing result; considering the torque of the one torque combination about the output shaft of the front wheel electric motor and the torque of the one torque combination about the output shaft of the rear wheel electric motor as a torque to be actually applied by the output shaft of the front wheel electric motor and a torque to be actually applied by the output shaft of the rear wheel electric motor respectively, and controlling the front wheel electric motor and the rear wheel electric motor correspondingly.

Optionally, each torque combination ensures that the total torque=the torque exerted or applied by the output shaft of the front wheel electric motor*the transmission ratio of the front wheel reducer+the torque exerted or applied by the output shaft of the rear wheel electric motor*the transmission ratio of the rear wheel reducer.

Optionally, calculation of the each torque combination is optimized by iteration.

Optionally, the power loss of the front wheel electric motor=(the torque exerted or applied by the output shaft of the front wheel electric motor*the rotating velocity of the output shaft of the front wheel electric motor)*$(1-\eta_F)/\eta_F$, the power loss of the rear wheel electric motor=(the torque exerted or applied by the output shaft of the rear wheel electric motor*the rotating velocity of the output shaft of the rear wheel electric motor)*$(1-\eta_R)/\eta_R$, the $n_F$ is the front wheel electric motor's efficiency and the $\eta_R$ is the efficiency of the rear wheel electric motor's efficiency.

Optionally, the front wheel electric motor is controlled by its motor controller, and the rear wheel electric motor is controlled by its motor controller.

Optionally, for various running velocity and accelerating requirements of the electric vehicle, torques to be exerted or applied by the output shafts of the front wheel electric motor and the rear wheel electric motor are determined and stored in advance; when the electric motor is running, the stored torques are revoked, depending on the extent to which the accelerator pedal or the brake pedal of the electric vehicle is pressed, so as to control the front wheel electric motor and the rear wheel electric motor respectively.

Optionally, the transmission ratio of the front wheel reducer is less than the transmission ratio of the rear wheel reducer.

Optionally, the transmission ratio of the front wheel reducer is 40%~90% of the transmission ratio of the rear wheel reducer.

Optionally, a stator's outer diameter, a stator's inner diameter, a rotor's outer diameter and a rotor's inner diameter of the front wheel electric motor are equal to a stator's outer diameter, a stator's inner diameter, a rotor's outer diameter and a rotor's inner diameter of the rear wheel electric motor respectively.

Using the above inventive means, the efficiency (or energy utilization efficiency) of the drive system of the electric vehicle can be enhanced and the electric vehicle's endurance mileage can be increased when the electric vehicle's manufacturing costs are not greatly increased and the operating performance of the electric vehicle will not be apparently reduced.

BRIEF DESCRIPTION OF THE DRAWINGS

The principles and other aspects of the present application will be well understood by the following description in combination of the attached drawings. It should be noticed that for clarify only the drawings may be given in different ratios, which will not affect understanding to the present application. In the drawings.

DETAILED DESCRIPTION

Figure 1:
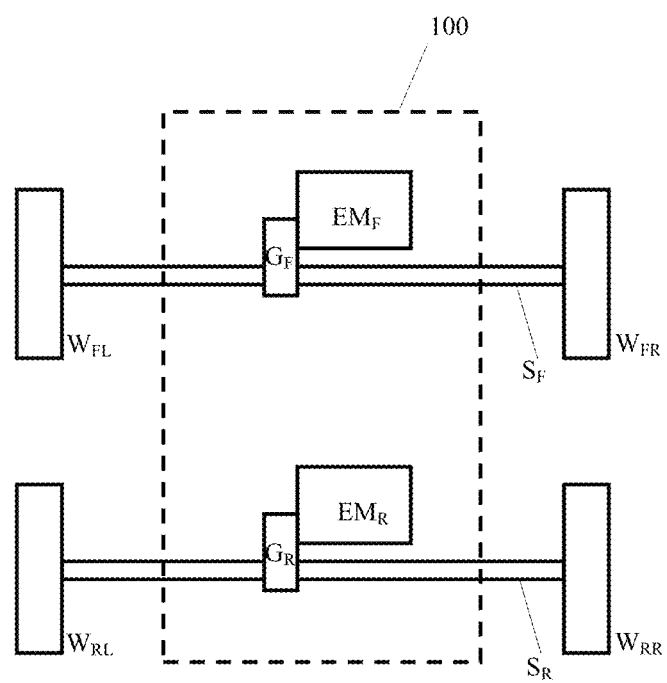
FIG. 1 is a view schematically illustrating a drive system of an electric vehicle according to one embodiment of the present application.

In the drawings of the present application, those features having the same configuration or similar functions may be represented by the same reference numerals respectively.

FIG. 1 schematically shows a drive system 100 for an electric vehicle according to one embodiment of the present application. This drive system 100 is configured to include vehicle suspension (not shown) on which constituent parts of the drive system 100 mentioned below could be installed. For example, the drive system 100 is further configured to include a front wheel electric motor $EM_F$ and a relevant front wheel drive axle $S_F$ which are installed on the suspension and a rear wheel electric motor $EM_R$ and a relevant rear wheel drive axle $S_R$ which are installed on the suspension. The front wheel drive axle $S_F$ is rotatably installed on the suspension such that the front wheel drive axle $S_F$ is installed with two front wheels $W_{FL}$ and $W_{FR}$ at opposing ends thereof respectively. The rear wheel drive axle $S_R$ is rotatably installed on the suspension such that the rear wheel drive axle $S_R$ is installed with two rear wheels $W_{RL}$ and $W_{RR}$ at both opposing thereof respectively.

The drive system 100 is also configured to include a front wheel reducer $G_F$ disposed between the front wheel drive axle $S_F$ and the front wheel electric motor $EM_F$, for example installed there by the suspension. Additionally, the drive system 100 is also configured to include a rear wheel reducer $G_R$ disposed between the rear wheel drive axle $S_R$ and the rear wheel electric motor $EM_R$, for example installed there by the suspension. An input shaft of the front wheel reducer $G_F$ is coupled to a rotatable shaft of the front wheel electric motor $EM_F$, and an output shaft of the front wheel reducer $G_F$ is coupled to the front wheel drive axle $S_F$. Similarly, an input shaft of the rear wheel reducer $G_R$ is coupled to a rotatable shaft of the rear wheel electric motor $EM_R$, and an output shaft of the rear wheel reducer $G_R$ is coupled to the rear wheel drive axle $S_R$. In this way, it is ensured that the rotatable shaft (i.e., output shaft) of the front wheel electric motor $EM_F$ is operatively coupled to the front wheel drive axle $S_F$ via the front wheel reducer $G_F$; and the rotatable shaft (i.e., output shaft) of the rear wheel electric motor $EM_R$ is operatively coupled to the rear wheel drive axle $S_R$ via the rear wheel reducer $G_R$.

In the present application, the front wheel electric motor $EM_F$ and the rear wheel electric motor $EM_R$ can be electric motors of the same specification. It should be understood by one ordinary person in the art that the same specification does not means that theirs power-torque characteristics are completely identical to each other. In fact, any difference between them in a given range is permissible. In the context of the present application, preferably, the same specification of the two electric motors means that stators of the two electric motors have the same outer diameter and the same inner diameter, and rotors of the two electric motors have the same outer diameter and the same inner diameter respectively. In the context of the present application, the reducer may refer to a reducing mechanism with a fixed transmission ratio, for example a gear reducer. The gear reducer can be a two-stage or multi-stage gear reducer. The gear reducer can be in the form of a planetary gear reducer. Of course, it is conceived by the ordinary person in the art that any other suitable reducer capable of being used in the electric vehicle to transfer power from the electric motor to the drive axle can be also adopted in the technical solution of the present application. Take the gear reducer for example. The front wheel reducer $G_F$ has a transmission ratio $r_F$, and the rear wheel reducer $G_R$ has a transmission ratio $r_R$. A transmission ratio r refers to a ratio between a peak rotating speed of an electric motor EM and a peak rotating speed of a wheel drive axle S. The rotating speed of the wheel drive axle D is equal to the rotating speed of the vehicle's wheel. A linear correspondence relationship exists between the rotating speed of the vehicle's wheel and the vehicle's running velocity. According to the embodiment of the present application, $r_F<r_R$. More particularly, $r_F=(40\%\sim90\%)*r_R$.

When the electric vehicle is accelerated, its gravity moving backwards will result in that contact friction between the rear wheels and the ground will become greater, such that during initial acceleration of the vehicle torques acted on the rear wheels will have a greater influence on the acceleration than torques acted on the front wheels. In a conventional drive system (whose front and rear wheel's electric motors are of the same specification and which front and rear wheel's reducers have the same transmission ratio), this will means that during acceleration of the electric vehicle, when the entire torque output by the rear wheel's electric motor is used for the acceleration, the torque and power output by the front wheel's electric motor cannot be utilized sufficiently due to less contact friction between the front wheels (or their tires) and the ground. That is to say, during the acceleration of the vehicle, some on-wheel torque on the front wheels is wasted. That is, the peak torque of the front wheel's electric motor is underutilized when the electric vehicle is operated to run at a lower speed (less than 5 kilometers per hour (km/h)). In view of this, according to the embodiment of the present application, the transmission ratio $r_F$ of the front wheel reducer $G_F$ is set to be less than the transmission ratio $r_R$ of the rear wheel reducer $G_R$, especially 40%~90% of the transmission ratio $r_R$ of the rear wheel reducer $G_R$. This will means that in comparison with the conventional drive system, the drive system according to the present application will avoid the on-wheel torque on the front wheels being wasted during the acceleration of the electric vehicle.

Figure 2A:
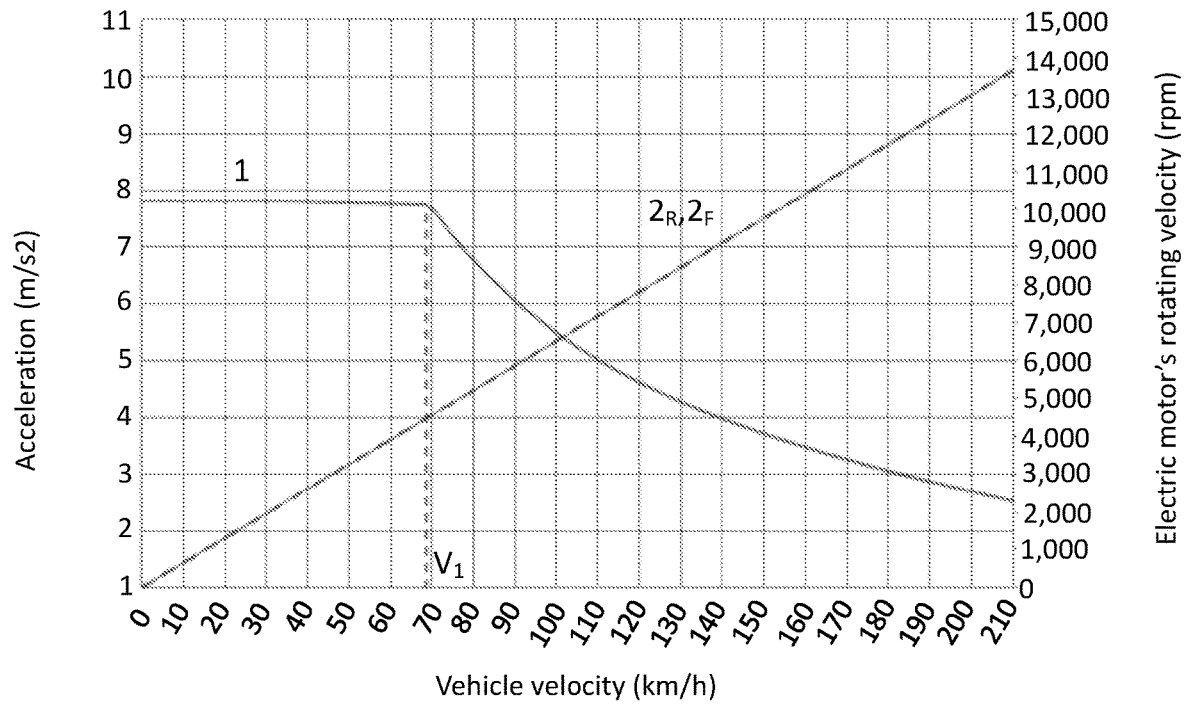
FIG. 2A is a view schematically illustrating acceleration performance of a conventional electric vehicle.
Figure 2B:
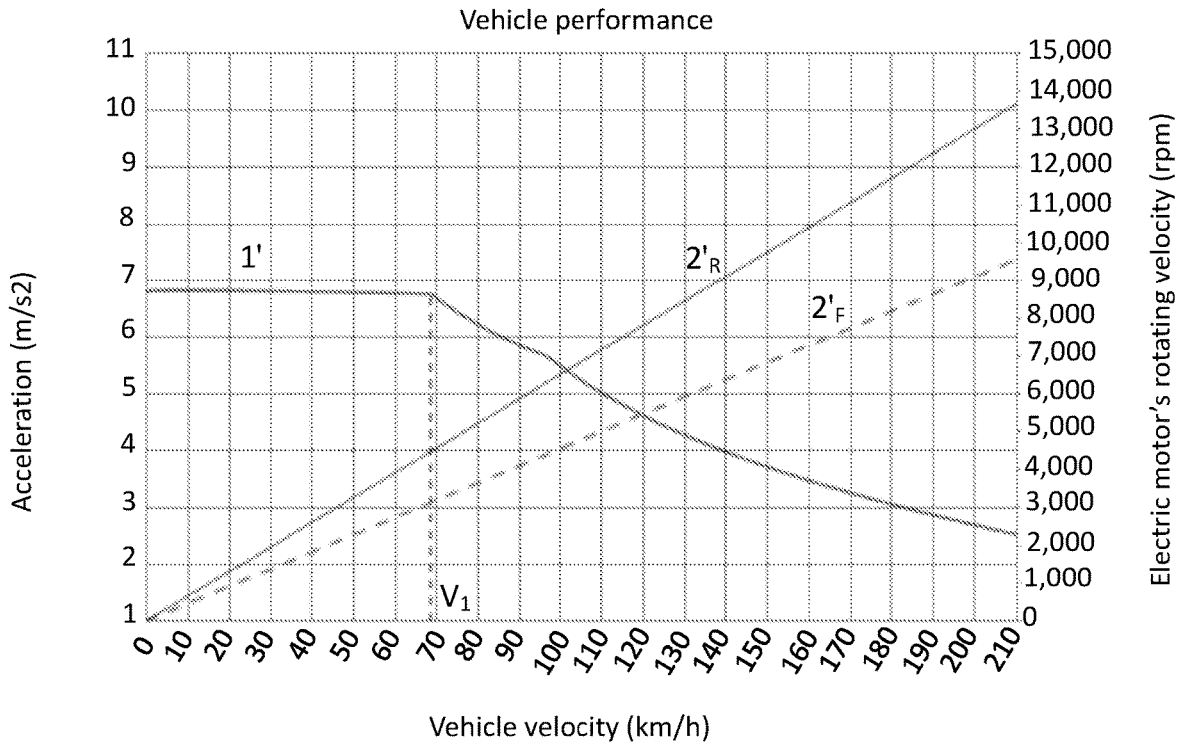
FIG. 2B is a view schematically illustrating acceleration performance of the electric vehicle equipped with the driving system according to the present application.
Figure 3:
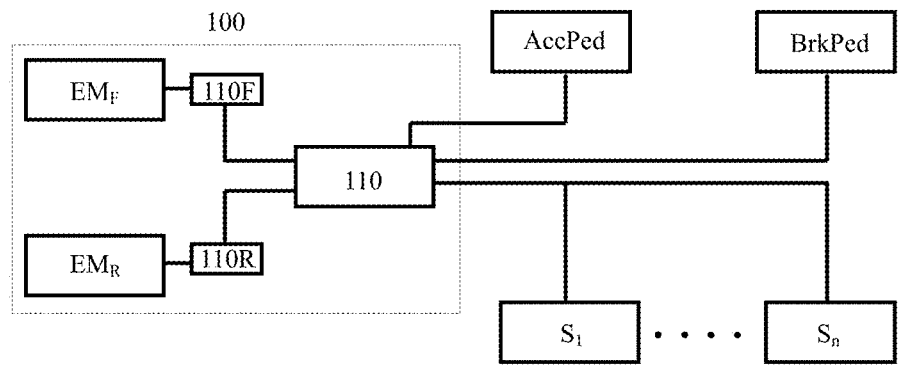
FIG. 3 is a view schematically illustrating connection between modules of the drive system and other modules of the electric vehicle.

The running performance, especially the acceleration performance of the electric vehicle equipped with the conventional drive system is schematically shown by FIG. 2A. The running performance, especially the acceleration performance of the electric vehicle equipped with the drive system according to the present application is schematically shown by FIG. 2B. In FIGS. 2A and 2B, the abscissa axis represents the electric vehicle's running velocity; the left vertical axis represents the accelerated velocity of the electric vehicle; and the right vertical axis represents the rotating speed of the shaft of the electric motor. In FIG. 2A, an acceleration curve of the electric vehicle is indicated by the reference numeral "1", a relation curve between the running velocity and the shaft's rotating speed (or called as shaft speed) of the front wheel's electric motor is indicated by the reference numeral "$2_F$", a relation curve between the running velocity and the shaft speed of the rear wheel's electric motor, having the same specification as the front wheel's electric motor, is indicated by the reference numeral "$2_R$". As the reducers assigned for the front and rear wheel's electric motors have the same transmission ratio, the relation curves 2F and 2R regarding the front and rear wheel's electric motors substantially overlap with each other and are linear. In FIG. 2B, an acceleration curve of the electric vehicle is indicated by the reference numeral "1'", a relation curve between the running velocity and the shaft speed of the front wheel's electric motor $EM_F$ is indicated by the reference numeral "$2_F'$", a relation curve between the running velocity and the shaft speed of the rear wheel's electric motor $EM_R$, having the same specification as the front wheel's electric motor, is indicated by the reference numeral "$2_R'$".

As shown by FIG. 2A, for the electric vehicle equipped with the conventional drive system, the vehicle's running velocity (or called as vehicle velocity) is configured to generally correspond to the shaft speeds of the front wheel's electric motor $EM_F$ and the rear wheel's electric motor $EM_R$. However, as shown by FIG. 2B, for the electric vehicle equipped with the drive system according to the present application, as the transmission ratios of the reducers assigned respectively for the front and rear wheel's electric motors are different than each other, the shaft of the front wheel's electric motor $EM_F$ will be operated at a rotating speed different than the shaft of the rear wheel's electric motor with the electric vehicle running at a given (or arbitrary) velocity. It will mean that the shaft of the front wheel's electric motor and the shaft of the rear wheel's electric motor will work in different operating zones which may be spaced from each other. Therefore, it will be possible to make dynamic torque distribution between the electric motors so as to maximize the efficiency of the drive system.

Therefore, the efficiency of the electric drive system can be substantially improved and thus the electric vehicle's endurance mileage can be increased by a method described below and used to control the efficiency distribution between the front and rear wheel's electric motors at different vehicle velocities.

Although a curve section of the acceleration curve 1' of the electric vehicle prior to a vehicle velocity $V_1$ as shown by FIG. 2B is slightly lower than a curve section of the acceleration curve 1 of the acceleration curve 1 of the electric vehicle prior to the same vehicle velocity $V_1$ as shown by FIG. 2A (i.e. although there is difference in absolute value between the two curve sections), this minor difference may just slightly change the overall performance of the electric vehicle. For instance, this minor difference may cause that acceleration time from 0 to 100 km/h regarding the acceleration curve 1' of the electric vehicle is less than acceleration time from 0 to 100 km/h regarding the acceleration curve 1 of the electric vehicle only by a value not greater than 0.6 second. For most non-racing cars, such minor difference of at most 0.6 second will not greatly affect driving experience; however may result in an increased endurance mileage. Therefore, the technical solution according to the present application may achieve an effective balance between the overall performance and the efficiency of the electric vehicle.

In the embodiment of the present application, the drive system 100 is further configured to include a central controller 110, which is electrically connected to a motor controller 110F of the front wheel's electric motor $EM_F$ and to a motor controller 110R of the rear wheel's electric motor $EM_R$, for example electrically connected to them by a suitable bus of the electric vehicle. The motor controllers 110F and 110R are configured to receive instructions from the central controller 110 independently from each other, so as to control operation of the front wheel's electric motor $EM_F$ or the rear wheel's electric motor $EM_R$ respectively. Furthermore, the central controller 110 is also electrically connected, via the bus, to an accelerator pedal AccPed and a brake pedal BrkPed of the electric vehicle and some other suitable sensors Si, . . . , Sn (n being an integer greater than 1) such as a vehicle velocity sensor, an acceleration sensor or the like. The central controller 110 is configured to receive signals from the accelerator pedal AccPed, the brake pedal BrkPed and the sensors so as to control operation of the front wheel's electric motor $EM_F$ and/or the rear wheel's electric motor $EM_R$ respectively.

Figure 4:
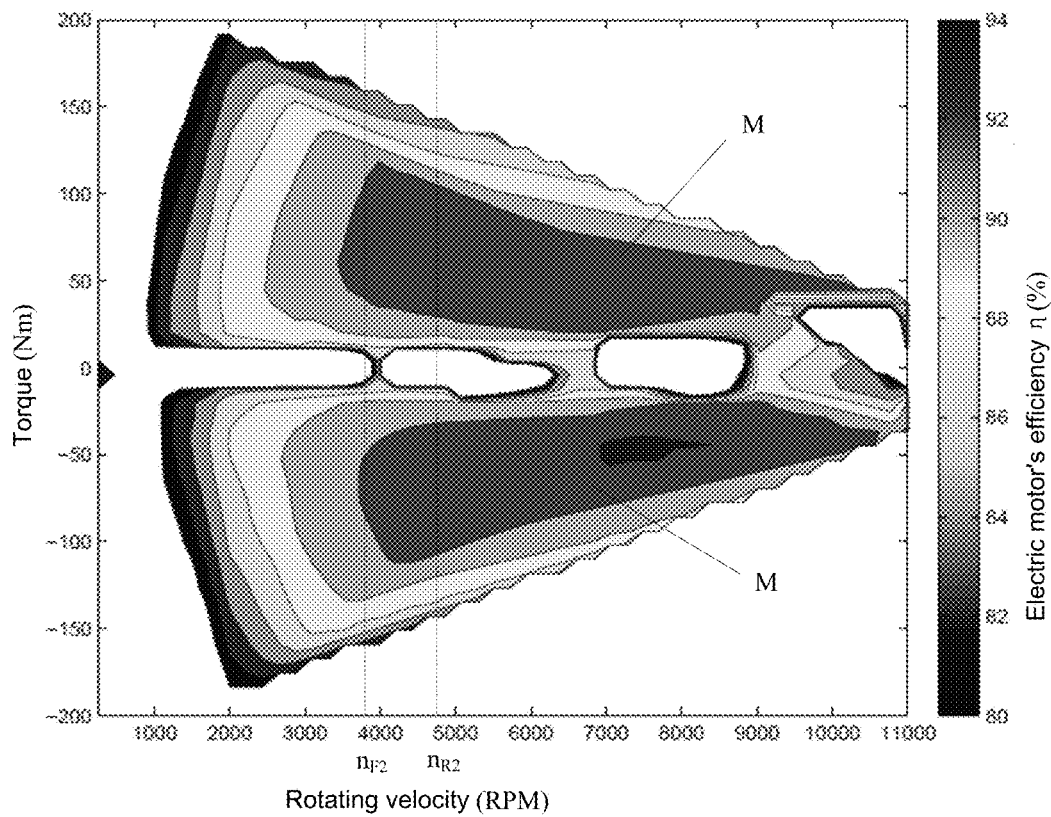
FIG. 4 is a diagram schematically illustrating distribution of torque, rotating speed of a shaft, and efficiency of an electric motor.

For a single electric motor, the percentage of the electric motor's output power to the electric motor's input power is defined as the electric motor's efficiency. Therefore, the efficiency of the electric motor may vary depending on external loading requirements at different rotating speeds of the electric motor's shaft. FIG. 4 shows a diagram schematically illustrating distribution relationship between the electric motor's torque, the shaft speed of the electric motor, and the efficiency of the electric motor.

Assume that in the electric vehicle of the present application it is desired to press the accelerator pedal so as to accelerate the electric vehicle and enable the same to run at a velocity $V_2$ as shown by FIG. 2B. Because of the difference between the ratios of the front and rear wheel reducers, the shaft speed of the front wheel's electric motor $EM_F$ is also different than the shaft speed of the rear wheel's electric motor $EM_R$. For example, the vehicle velocity $V_2$ is associated with a shaft speed $n_{F2}$ of the front wheel's electric motor $EM_F$ and a shaft speed $n_{R2}$ of the rear wheel's electric motor $EM_R$. Then return to FIG. 4. Two vertical lines are made, perpendicular to the abscissa axis representing the shaft speed of the electric motor, to represent the two shaft speeds $n_{F2}$ and $n_{R2}$. Therefore, for the front wheel's electric motor $EM_F$, its motor efficiency could be designed and controlled on the basis of the line different than the rear wheel's electric motor $EM_R$, so as to increase a selection range facilitating in improving the efficiency of the drive system. In this way, the electric vehicle's endurance mileage can be increased correspondingly.

A method for controlling the drive system of the electric vehicle according to one embodiment of the present application will be explained with respect to FIG. 5 below. In the drive system of the present application, two electric motors are adopted. Therefore, it is required to let the electric motors work in a state that their efficiency is as high as possible at any running state of the electric vehicle. That is, it is required to let the electric motors work in a region M (as shown by FIG. 4) of relative high efficiency, such that the power usage effectiveness and the endurance mileage of the electric vehicle can be increased. The method for controlling the drive system according the present application as mentioned below can get this goal. It should be understood by the ordinary person in the art that the method as mentioned below can be stored as program instructions in a memory of the central controller 110 and, when desired, can be invoked and executed in the central controller 110.

The method of the present application can be used to control acceleration of the electric vehicle and its braking energy recovery. It should be understood by the ordinary person in the art that the on-wheel torque or the torque output by the electric motor during the acceleration of the electric motor is a positive value; and the on-wheel torque or the torque output by the electric motor during the deceleration of the electric motor is a negative value. However, in the following description of the present application, the torque concerned refers to an absolute value of the torque and is irrelevant to the direction of the torque. Steps of the method will be explained below referring to the acceleration of the electric vehicle.

In a step S10, the position and/or extent to which the accelerator pedal and/or the brake pedal of the electric vehicle is pressed by a user will be determined. In a step S20, according to the determined position and/or extent to which the accelerator pedal is pressed and the current vehicle velocity, a total torque $T_{demand}$ demanded to be exerted on the front wheel drive axle $S_F$ and the rear wheel drive axle $S_R$ so as to accelerate the electric vehicle correspondingly can be calculated. That is to say, only when toques applied on the front wheels $W_{FL}$, $W_{FR}$ and the rear wheels $W_{RL}$, $W_{RR}$ amount to the total torque $T_{demand}$, the electric vehicle can be accelerated following a manner corresponding to the extent to which the accelerator pedal is pressed. The calculation process in the step S20 can be carried out by the central controller 110 comparing the determined data and correspondingly querying database previously stored in the memory or making the calculation via a suitable formula in real time. Here, the torque $T_{demand}$ may refer to an on-wheel torque.

Next, in a step S30, the shaft speed $n_F$ of the front wheel reducer $G_F$ and the shaft speed $n_R$ of the rear wheel reducer $G_R$ can be respectively determined on the basis of a velocity at which the electric vehicle is demanded to run and the transmission ratios $r_F$, $r_R$ of the front and rear wheel's electric motors $EM_F$, $EM_R$. For instance, the vehicle velocity can be computationally converted into the rotating speeds of the front wheel drive axle $S_F$ and the rear wheel drive axle $S_R$; and then, the transmission ratios $r_F$, $r_R$ can be used in combination with the rotating speeds to determine the shaft speeds $n_F$, $n_R$ of the front and rear wheel's electric motors $EM_F$, $EM_R$.

Then, in a step S40, according to the relationship between the electric motor's torque, the electric motor's shaft speed, and the electric motor's efficiency (as shown by FIG. 4, which can be as diagram database stored previously in the memory) and the manner described with respect to FIG. 4, a suitable torque combination can be selected from different feasible torque combinations of the torque output by the front wheel's electric motor $EM_F$ and the torque output by the rear wheel's electric motor $EM_R$, which can be used to determine an axle power loss of the front wheel drive axle $S_F$ and an axle power loss of the rear wheel drive axle $S_R$. The selection of the torque combination is mainly based on a principle that $T_{demand} = T_{EMFassume} * r_F + T_{EMRassume} * r_R$. For instance, for given values of the shaft speeds $n_F$, $n_R$, and from the relationship between the electric motor's torque, the electric motor's shaft speed, and the electric motor's efficiency, it is first assumed that some torque for example $T_{EMFassume}$ is output by the front wheel's electric motor $EM_F$ and some torque for example $T_{EMRassume}$ is output by the rear wheel's electric motor $EM_R$. Then, according to the torques $T_{EMFassume}$ and $T_{EMRassume}$, the efficiencies $\eta_F$, $\eta_R$ of the front and rear wheel's electric motors associated with them can be determined correspondingly. For example, when the values of the shaft speeds $n_F$, $n_R$ are definite, a plurality of output torques $T_{EMFassume}$ and $T_{EMRassume}$ and associated electric motor's efficiencies can be determined at a predefined computation interval. Therefore, for the different output torques, power losses of the front wheel's electric motor $EM_F$ and power losses of the rear wheel's electric motor $EM_R$ can be determined respectively. For example, the power loss of the front wheel's electric motor $EM_F = (T_{EMFassume} * n_F) * (1 - \eta_F) / \eta_F$; and the power loss of the rear wheel's electric motor $EM_R = (T_{EMRassume} * n_R) * (1 - \eta_R) / \eta_R$.

Then, in a step S50, for each of the various output torque combinations, the power loss of the front wheel's electric motor $EM_F$ and the power loss of the rear wheel's electric motor $EM_R$ are summed respectively; and from the summed results for the various combinations, a minimized result can be determined. This process can be accomplished iteratively by optimization calculation.

Finally, in a step S60, the torque combination of $T_{EMFassume}$ and $T_{EMRassume}$ corresponding to the minimized result can be designated as a torque $T_{EMF}$ to be actually output by the front wheel's electric motor $EM_F$ and a torque $T_{EMR}$ to be actually output by the rear wheel's electric motor $EM_R$. Therefore, based on the designated torques, the motor controllers output instructions to the front and rear wheel's electric motors $EM_F$, $EM_R$ to enable them to generate corresponding torques.

Figure 5:
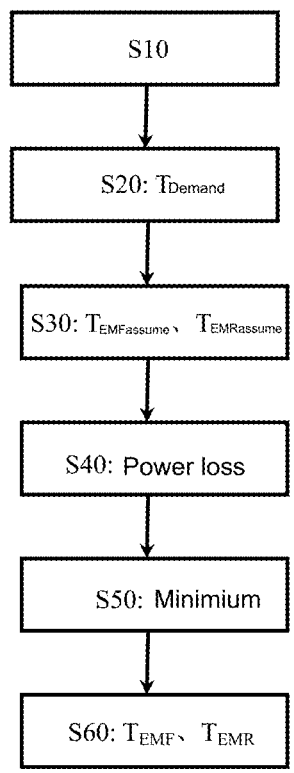
FIG. 5 is a flow chart schematically illustrating a controlling method according to an embodiment of the present application.

It should be understood by the ordinary person in the art that in an alternative embodiment, the method as shown by FIG. 5 can be tested by experiments in advance and stored as database in the memory of the drive system of the electric vehicle. In actual running of the electric vehicle, depending on the extent to which the accelerator pedal is pressed, the central controller is configured to recall a suitable combination of the torque $T_{EMF}$ required to be output by the front wheel's electric motor $EM_F$ and the torque $T_{EMR}$ required to be output by the rear wheel's electric motor $EM_R$, and thus control operations of the front and rear wheel's electric motors $EM_F$, $EM_R$. In this way, real-time computational source consumption of the central controller can be reduced.

Furthermore, it is understood by the ordinary person in the art that although the steps S10 to S60 are aimed at the acceleration process of the electric vehicle, the similar method steps apply for the braking energy recovery process of the electric vehicle. For instance, alternatively, during the braking energy recover process of the electric vehicle, in the step S20, on the basis of a position of the brake pedal and the electric vehicle's velocity, a total torque $T_{demand}$ required to carry out recovery power generation on the front wheel drive axle $S_F$ and the rear wheel drive axle $S_R$ is determined. That is to say, during braking of the electric vehicle, a sum of braking torques applied on the front wheels $W_{FL}$, $W_{FR}$ and braking torques applied on the rear wheels $W_{RL}$, $W_{RR}$ (which sum is equal to the total torque $T_{demand}$) is converted to generate electric power. Then, alternatively, in the steps S30 to S60, the torques output previously mentioned will be replaced respectively by retarding torques generated by the front and rear wheel's electric motors $EM_F$, $EM_R$ for recovery power generation. In this way, similarly, a suitable retarding torque combination can be determined under the premise of the efficiency loss of the system being minimized. Then, correspondingly, an actual retarding torque required by the front wheel's electric motor $EM_F$ and an actual retarding torque required by the rear wheel's electric motor $EM_R$ can be determined, and based on them, the front and rear wheel's electric motors $EM_F$, $EM_R$ can be controlled correspondingly.

Using the inventive means, an electric motor control mode, resulting in a highest efficiency, can be automatically decided for different road conditions (such as uphill, downhill, or the like) such that a longer endurance mileage can be guaranteed without greatly reducing the performance of the electric vehicle.

Although some specific embodiments of the present application are described here, they are given for illustrative purposes only and cannot be deemed to constrain the scope of the present application in any way. Furthermore, it should be understood by the ordinary person in the art that the embodiments and/or examples described here can be arbitrarily combined with each other. Without departing from the spirit and scope of the present application, various replacements, modifications and alternations can be thought out.

The invention claimed is:

1. A drive system for an electric vehicle, comprising:
   a front wheel electric motor ($EM_F$) and a rear wheel electric motor ($EM_R$) of the same specification;
   a front wheel reducer ($G_F$) whose output shaft is operatively coupled to a front wheel drive axle ($S_F$) of the electric vehicle via the front wheel electric motor ($EM_F$); and
   a rear wheel reducer ($G_R$) whose output shaft is operatively coupled to a rear wheel drive axle ($S_R$) of the electric vehicle via the rear wheel electric motor ($EM_R$), wherein the front wheel reducer ($G_F$) has a transmission ratio different than that of the rear wheel electric motor ($EM_R$);
   wherein the transmission ratio ($r_F$) of the front wheel reducer ($G_F$) is less than the transmission ratio ($r_R$) of the rear wheel reducer ($G_R$), thereby minimizing torque output waste.

2. The drive system as recited in claim 1, wherein the transmission ratio ($r_F$) of the front wheel reducer ($G_F$) is 40%-90% of the transmission ratio ($r_R$) of the rear wheel reducer ($G_R$).

3. The drive system as recited in claim 1, wherein a stator's outer diameter, a stator's inner diameter, a rotor's outer diameter and a rotor's inner diameter of the front wheel electric motor ($EM_F$) are equal to a stator's outer diameter, a stator's inner diameter, a rotor's outer diameter and a rotor's inner diameter of the rear wheel electric motor ($EM_R$) respectively.

4. The drive system as recited in claim 3, further comprising:
a central controller; and
a motor controller of the front wheel electric motor ($EM_F$) and a motor controller of the rear wheel electric motor ($EM_R$) which are electrically connected to the central controller, so as to selectively control operation of the front wheel electric motor ($EM_F$) via the motor controller of the front wheel electric motor and operation of the rear wheel electric motor ($EM_R$) via the motor controller of the rear wheel electric motor.

5. The drive system as recited in claim 4, wherein the front wheel reducer ($G_F$) and/or the rear wheel reducer ($G_R$) is a gear reducer.

6. The drive system as recited in claim 5, wherein the front wheel electric motor ($EM_F$) is electrically connected to an accelerator pedal (AccPed) and/or a brake pedal (BrkPed) of the electric vehicle through the motor controller of the front wheel electric motor via the central controller and/or the rear wheel electric motor ($EM_R$) is electrically connected to the accelerator pedal (AccPed) and/or the brake pedal (BrkPed) of the electric vehicle through the motor controller of the rear wheel electric motor via the central controller; and wherein the front wheel electric motor ($EM_F$) and/or the rear wheel electric motor ($EM_R$) is selectively operated on the basis of the extent to which the accelerator pedal (AccPed) and/or the brake pedal (BrkPed) is pressed.

7. A method for controlling a drive system of an electric vehicle, the drive system including a front wheel electric motor ($EM_F$) and a rear wheel electric motor ($EM_R$) of the same specification; a front wheel reducer ($G_F$) whose output shaft is operatively coupled to a front wheel drive axle ($S_F$) of the electric vehicle via the front wheel electric motor ($EM_F$); and a rear wheel reducer ($G_R$) whose output shaft is operatively coupled to a rear wheel drive axle ($S_R$) of the electric vehicle via the rear wheel electric motor ($EM_R$), the front wheel reducer ($G_F$) having a transmission ratio different than that of the rear wheel electric motor ($EM_R$), the method comprising:
determining, on the basis of the extent to which an accelerator pedal (AccPed) or a brake pedal (BrkPed) of the electric vehicle is pressed, a total torque ($T_{demand}$) demanded to be exerted on the electric vehicle's wheels for accelerating it or for braking it respectively;
determining a rotating velocity ($n_F$) of the output shaft of the front wheel electric motor ($EM_F$) and a rotating velocity ($n_R$) of the output shaft of the rear wheel electric motor ($EM_R$) respectively on the basis of the vehicle's running velocity in combination of the transmission ratio ($r_F$) of the front wheel reducer ($G_F$) and the transmission ratio ($r_R$) of the rear wheel reducer ($G_R$); and
dividing the total torque ($T_{demand}$) between torque outputs of the front wheel electric motor ($EM_F$) and the rear wheel electric motor ($EM_R$) as a function of the transmission ratio ($r_F$) of the front wheel reducer ($G_F$) and the transmission ratio ($r_R$) of the rear wheel reducer ($G_R$) respectively by a way as follows:
determining, according to a relationship between the electric motor torque, rotating speed and efficiency, combinations of a torque ($T_{EMF}$) to be exerted or applied by the output shaft of the front wheel electric motor ($EM_F$) and a torque ($T_{EMR}$) to be exerted or applied by the output shaft of the rear wheel electric motor ($EM_R$) at a given step size;
calculating and summing a power loss of the front wheel electric motor ($EM_F$) and a power loss of the rear wheel electric motor ($EM_R$) with regard to each determined torque combination; and
comparing the summing results for all the torque combinations and finding one torque combination corresponding to the minimum summing result; considering the torque of the one torque combination about the output shaft of the front wheel electric motor ($EM_F$) and the torque of the one torque combination about the output shaft of the rear wheel electric motor ($EM_R$) as a torque to be actually applied by the output shaft of the front wheel electric motor ($EM_F$) and a torque to be actually applied by the output shaft of the rear wheel electric motor ($EM_R$) respectively, and controlling the front wheel electric motor ($EM_F$) and the rear wheel electric motor ($EM_R$) correspondingly;
wherein the transmission ratio ($r_F$) of the front wheel reducer ($G_F$) is less than the transmission ratio ($r_R$) of the rear wheel reducer ($G_R$), thereby minimizing torque output waste.

8. The method as recited in claim 7, wherein each torque combination ensures that the total torque ($T_{demand}$)=the torque ($T_{EMFassume}$) exerted or applied by the output shaft of the front wheel electric motor ($EM_F$)*the transmission ratio ($r_F$) of the front wheel reducer ($G_F$)+the torque exerted or applied by the output shaft of the rear wheel electric motor ($EM_R$)*the transmission ratio ($r_R$) of the rear wheel reducer ($G_R$).

9. The method as recited in claim 8, wherein calculation of the each torque combination is optimized by iteration.

10. The method as recited in claim 7, wherein the power loss of the front wheel electric motor ($EM_F$)=(the torque ($T_{EMFassume}$) exerted or applied by the output shaft of the front wheel electric motor ($EM_F$)*the rotating velocity ($n_F$) of the output shaft of the front wheel electric motor ($EM_F$))*$(1-\eta_F)/\eta_F$, the power loss of the rear wheel electric motor ($EM_R$)=(the torque ($T_{EMRassume}$) exerted or applied by the output shaft of the rear wheel electric motor ($EM_R$)*the rotating velocity ($n_R$) of the output shaft of the rear wheel electric motor ($EM_R$))*$(1-\eta_R)/\eta_R$, the $n_F$ is the front wheel electric motor's ($EM_F$) efficiency and the $\eta_R$ is the efficiency of the rear wheel electric motor's ($EM_R$) efficiency.

11. The method as recited in claim 7, wherein the front wheel electric motor ($EM_F$) is controlled by its motor controller, and the rear wheel electric motor ($EM_R$) is controlled by its motor controller.

12. The method as recited in claim 7, wherein for various running velocity and accelerating requirements of the electric vehicle, torques to be exerted or applied by the output shafts of the front wheel electric motor ($EM_F$) and the rear wheel electric motor ($EM_R$) are determined and stored in advance; when the electric motor is running, the stored torques are revoked, depending on the extent to which the accelerator pedal (AccPed) or the brake pedal (BrkPed) of the electric vehicle is pressed, so as to control the front wheel electric motor ($EM_F$) and the rear wheel electric motor ($EM_R$) respectively.

13. The method as recited in claim 7, wherein the transmission ratio ($r_F$) of the front wheel reducer ($G_F$) is 40%-90% of the transmission ratio ($r_R$) of the rear wheel reducer (G).

14. The method as recited in claim 7, wherein a stator's outer diameter, a stator's inner diameter, a rotor's outer diameter and a rotor's inner diameter of the front wheel electric motor ($EM_F$) are equal to a stator's outer diameter, a stator's inner diameter, a rotor's outer diameter and a rotor's inner diameter of the rear wheel electric motor ($EM_R$) respectively.

* * * * *